US012601134B2

(12) United States Patent
Cornford

(10) Patent No.: US 12,601,134 B2
(45) Date of Patent: Apr. 14, 2026

(54) COMPOSITION, METHOD AND SYSTEM FOR STABILISING A ROCK MASS

(71) Applicant: STRATALOCK PTY LTD, Morisset (AU)

(72) Inventor: Ethan Cornford, Morisset (AU)

(73) Assignee: STRATALOCK PTY LTD, Morisset (AU)

( * ) Notice: Subject to any disclaimer, the term of this patent is extended or adjusted under 35 U.S.C. 154(b) by 3 days.

(21) Appl. No.: 18/693,033

(22) PCT Filed: Mar. 2, 2023

(86) PCT No.: PCT/AU2023/050144
§ 371 (c)(1),
(2) Date: Mar. 18, 2024

(87) PCT Pub. No.: WO2023/168481
PCT Pub. Date: Sep. 14, 2023

(65) Prior Publication Data
US 2025/0092626 A1 Mar. 20, 2025

(30) Foreign Application Priority Data

Mar. 10, 2022 (AU) ................................ 2022900580

(51) Int. Cl.
*C04B 28/14* (2006.01)
*C04B 40/06* (2006.01)
(Continued)

(52) U.S. Cl.
CPC ................ *E02D 3/12* (2013.01); *C04B 28/14* (2013.01); *C04B 40/0658* (2013.01);
(Continued)

(58) Field of Classification Search
CPC ........... E21D 20/00; E02D 3/12; C04B 28/14; C04B 40/0658; C04B 2103/10;
(Continued)

(56) References Cited

U.S. PATENT DOCUMENTS

| | | | | |
|---|---|---|---|---|
| 2,627,169 | A | * | 2/1953 | Poulter .................. E02D 35/00 405/267 |
| 3,582,376 | A | * | 6/1971 | Ames .................... C04B 28/146 106/725 |

(Continued)

FOREIGN PATENT DOCUMENTS

| | | |
|---|---|---|
| AU | 2002302121 | 9/2005 |
| CN | 111606594 | 9/2020 |

(Continued)

OTHER PUBLICATIONS

International Search Report and Written Opinion for International (PCT) Patent Application No. PCT/AU2023/050144, dated Apr. 26, 2023, 16 pages.

(Continued)

*Primary Examiner* — Benjamin F Fiorello
(74) *Attorney, Agent, or Firm* — Sheridan Ross P.C.

(57) ABSTRACT

A composition for use in a method or a system to stabilise a material such as geological strata or a rock mass in which initially retarded gypsum is accelerated at the time of introduction or injection into the rock mass. The retarding of the gypsum may be accomplished by a retarder such as a hydration inhibitor mixed with the gypsum and the acceleration may be accomplished by an accelerant added to mixture of the gypsum and retarder. Upon introduction of the accelerant, water is also added to initially reduce the viscosity of the composition so as to be less than the initially (Continued)

100

110
Providing a Part A including water and a hydration inhibitor, a Part B including gypsum, and a Part C including an activator and water.

120
Mix Part A and Part B at or just prior to the time of use to provide Part AB 130
Further mix Part AB and Part C immediately prior use, such as when being introduced into the rock mass to provide a settable composition suitable for use as an injectable media to stabilise a rock mass.

retarded gypsum so as to make it more easily pumpable before becoming set within the geological strata or a rock mass.

20 Claims, 5 Drawing Sheets

(51) Int. Cl.

| | | |
|---|---|---|
| *E02D 3/12* | (2006.01) | |
| *C04B 103/10* | (2006.01) | |
| *C04B 103/20* | (2006.01) | |
| *C04B 111/00* | (2006.01) | |
| *E21F 17/00* | (2006.01) | |

(52) U.S. Cl.
CPC ...... *C04B 2103/10* (2013.01); *C04B 2103/20* (2013.01); *C04B 2111/00146* (2013.01); *C04B 2111/00724* (2013.01); *E21F 17/00* (2013.01)

(58) Field of Classification Search
CPC ....... C04B 2103/20; C04B 2111/00146; C04B 1111/00724; E21F 17/00
See application file for complete search history.

(56) References Cited

U.S. PATENT DOCUMENTS

| | | | | |
|---|---|---|---|---|
| 4,891,072 | A | 1/1990 | Cooper | |
| 5,725,656 | A * | 3/1998 | Shimanovich | C04B 28/14 |
| | | | | 106/781 |
| 6,482,258 | B2 * | 11/2002 | Styron | C04B 28/04 |
| | | | | 106/DIG. 1 |
| 2004/0187741 | A1 | 9/2004 | Liu et al. | |
| 2013/0195553 | A1 * | 8/2013 | Yildirim | E01C 3/04 |
| | | | | 523/132 |
| 2021/0087457 | A1 * | 3/2021 | Abd Rahman | C04B 40/0032 |
| 2023/0110018 | A1 * | 4/2023 | Niessner | C04B 24/2641 |
| | | | | 524/2 |

FOREIGN PATENT DOCUMENTS

| | | |
|---|---|---|
| GB | 2262147 | 6/1993 |
| WO | WO 99/48833 | 9/1999 |
| WO | WO 2014/179828 | 11/2014 |

OTHER PUBLICATIONS

Written Opinion of the International Preliminary Examining Authority for International (PCT) Patent Application No. PCT/UA2023/050144, dated Nov. 21, 2023, 5 pages.

* cited by examiner

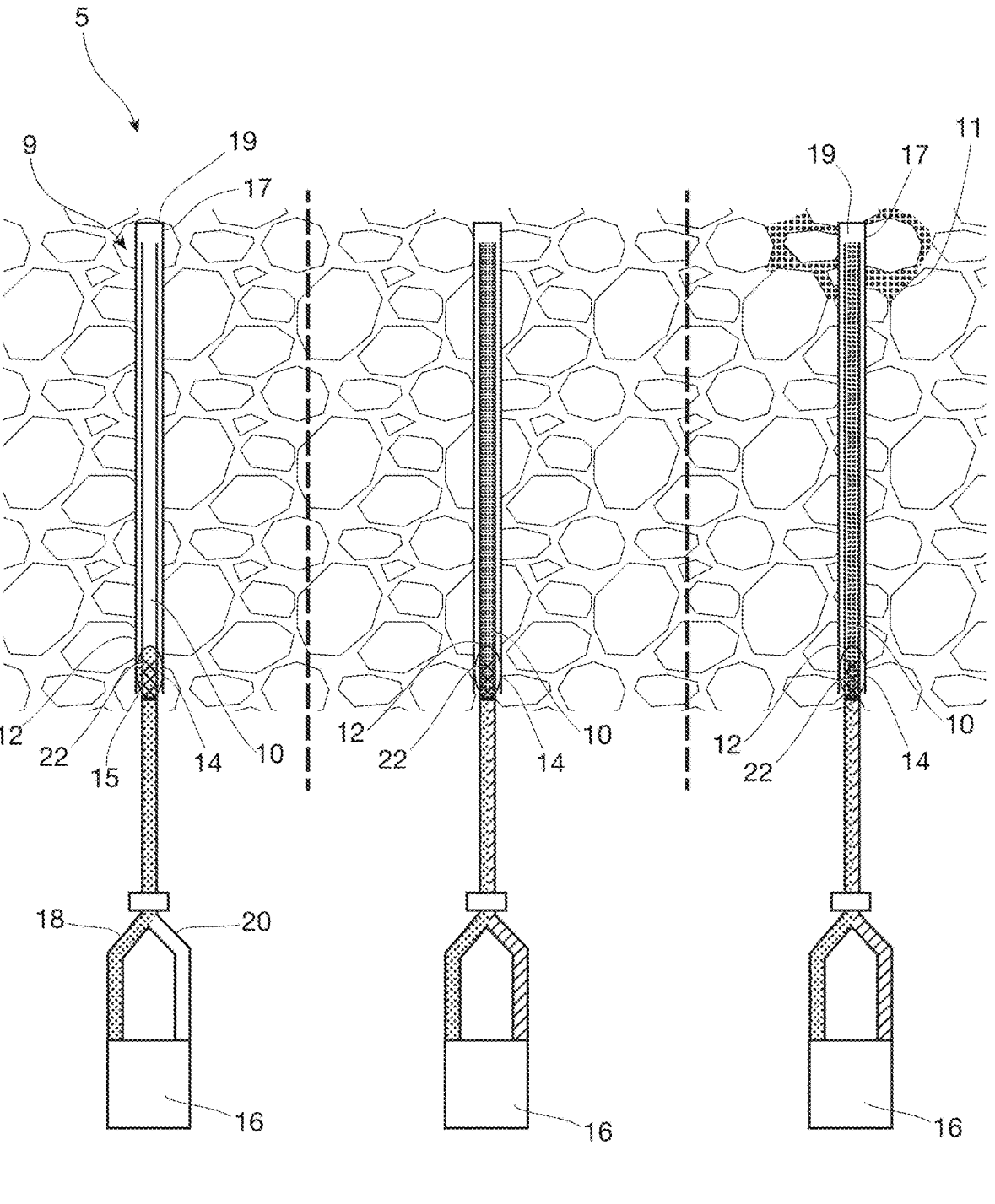
Figure 2                    Figure 3                    Figure 4

COMPOSITION, METHOD AND SYSTEM FOR STABILISING A ROCK MASS

CROSS-REFERENCE TO RELATED APPLICATIONS

This application is a national stage application under 35 U.S.C. 371 and claims the benefit of PCT Application No. PCT/AU2023/050144 having an international filing date of 2 Mar. 2023, which designated the United States, which PCT application claimed the benefit of Australian provisional patent application no. 2022900580 filed on 10 Mar. 2022, the contents of each of which are incorporated by reference in their entireties.

TECHNICAL FIELD

The invention relates to a composition, a method and a system for stabilising a rock mass. In particular, the invention relates to a composition, a method and a system for stabilising a rock mass in which the composition is injected into the rock mass.

BACKGROUND

Rock masses such as coal, shale, mudstone and sandstone may be stabilised by a variety of techniques. One method of stabilising a rock mass includes drilling hole and then injecting a media into that hole. The media may be, for example, a slurry, or a resin such as polyurea silicates and polyurethanes, that are forced under pressure into the hole to fill the voids and cracks in the broken rock mass to form a solid block or strata band which functions to increase the strength of the rock mass.

A problem with such media such as those including polyurea silicates and/or polyurethanes relates to the toxicity, for example, high levels of formaldehydes and carcinogens that may be produced, which may require stringent safety controls and pose health checks for operators.

Another problem relates to the exothermic reaction caused by the polyurea silicates and/or polyurethanes. This exothermic reaction has been known to cause the surrounding coal rock mass to reach a temperature which given the right conditions can lead to thermal runaway and dangerous conditions in an underground mine. As a result of this, limits to the quantity in which the product may be delivered are implemented which can affect the performance of the stabilised rock mass. Some events have shown that the quantity limits imposed are not always effective on stopping the surrounding rock mass from reaching temperatures where thermal runaway can occur.

Compositions containing a polymer component and gypsum have been proposed to be used as membrane coating on various target substrates such as a surface coating on an exposed rock surface. One such composition is disclosed in AU 2002302121. The composition is prepared in two separate components, Part A containing a resin, such as an alkaline polymer resin, a gypsum and a hydration inhibitor, such as acrylic acid, to prevent the premature setting of the gypsum. The second component, Part B, contains a different resin such as acidic polymer resin, a filler and an activator such as aluminium sulphate, which, when combined with Part A will initiate the setting of the gypsum.

The composition may be supplied to a work site in two components, Part A containing the gypsum and Part B consisting primarily of the polymer resin and the activator. The two components are applied to the target surface either separately or immediately after being blended where they rapidly react to form a quick setting membrane.

A problem with the composition as disclosed in AU 2002302121 is that during transportation and/or storage suspended solids, mainly of Part A, may be settle and become "packed" in the container. The suspended solids cannot be easily re-suspended. Another problem with the composition as disclosed in AU 2002302121 is that strength of the mixed and set material may be less than desirable for use as an injectable composition. Other problems relate to the setting speed, and its ability to be pumped and propagate into cracks and crevasses of the rock.

The invention disclosed herein seeks to overcome one or more of the above identified problems, or at least provide a useful alternative.

SUMMARY

In accordance with a first broad aspect there is provided, a composition for use in a method and a system to stabilise a material such as geological strata or a rock mass in which initially retarded gypsum is accelerated at the time of introduction or injection into the rock mass. The retarding of the gypsum enables the use of gypsum in the application of the composition as an injectable media. The retarding of the gypsum may be accomplished by a hydration inhibitor that may be, but not limited to, a dispersant. The acceleration at the time of introduction or injection into the rock mass may be accomplished by using an accelerant such as, but not limited to, a salt such as aluminium sulphate dissolved in water. Upon introduction of the accelerant, water may also be added to initially reduce the viscosity of the composition so as to be less than the initially retarded gypsum so as to make it more easily pumpable, and able to enter cracks of the geological strata or the rock mass the before becoming set within the geological strata or the rock mass.

In accordance with a second broad aspect there is provided, an injectable composition for stabilising a rock mass by pumping the injectable composition through a rod into a hole in the rock mass, the composition including: a Part A including water and a hydration inhibitor; a Part B including gypsum; and a Part C including an activator and water, wherein the composition is formed by mixing the Part A and the Part B to provide a Part AB, and then further mixing Part AB with the Part C immediately prior to introduction into the rock mass to provide the injectable composition, wherein the Part AB is adapted to remain at a first viscosity below a pumpable viscosity threshold for a first time period, and wherein the mixing of the Part C with the Part AB results in the injectable composition having a second viscosity less than the first viscosity so as to be suitable for injection into the rock mass, the second viscosity increasing over a setting time period such that the composition becomes set within the rock mass.

In an aspect, the second viscosity remains below the pumpable viscosity threshold for an injection time period.

In another aspect, the injection time period is at least 1 minute.

In yet another aspect, the injection time period is in the range of 1 to 10 minutes.

In yet another aspect, the injection time period is in the range of about 2 to 5 minutes.

In yet another aspect, the second viscosity is at least about 1,000 cps less than the first viscosity.

In yet another aspect, the second viscosity is at least about 2,500 cps less, and preferably 5,000 cps less, than the first viscosity.

In yet another aspect, the first time period is at least about 10 minutes, preferably at least about 20 minutes and most preferably at least about 30 minutes.

In yet another aspect, the hydration inhibitor is increased to increase the first time period.

In yet another aspect, the pumpable viscosity threshold is about 20,000 cps.

In yet another aspect, first viscosity is preferably less than about 10,000 cps.

In yet another aspect, the second viscosity is less than about 5,000 cps, preferably less than about 2,500 cps and most preferably less than or about 1,000 cps.

In yet another aspect, the setting time period is less than about 2 hours.

In yet another aspect, the setting time period is less than about 1 hour.

In yet another aspect, the setting time period is preferably in the range of about 10 minutes to 2 hours.

In yet another aspect, the second viscosity increases toward a set viscosity, the set viscosity being at least over 25,000 cps and preferably over 50,000 cps.

In yet another aspect, the activator is increased to reduce the setting time period.

In yet another aspect, the hydration inhibitor of Part A is a dispersant.

In yet another aspect, the hydration inhibitor of Part A is a hydrophilic copolymer pigment dispersant.

In yet another aspect, the hydration inhibitor of Part A is about between 0.01% to 2% by weight of the mixed composition.

In yet another aspect, water associated with Part A and Part C is about between 5% to 40%, and preferably about 10% to 30%, by weight of the mixed composition.

In yet another aspect, Part B is a dry gypsum powder.

In yet another aspect, the gypsum of Part B is about between 30% to 75%, and preferably 50% to 70%, by weight of the mixed composition.

In yet another aspect, the activator of Part C is a salt.

In yet another aspect, the activator of Part C is Aluminium Sulphate dissolved in the water.

In yet another aspect, the activator of Part C is about between 0.01% to 1%, and preferably between about 0.01% and 0.22%, by weight of the mixed composition.

In yet another aspect, Part A further includes one or more polymers such that when mixed with Part AB form a polymer modified gypsum.

In yet another aspect, Part A further includes one or more of a defoamer, a surfactant, a coelescent and an alkali agent.

In accordance with a third broad aspect there is provided, a method of stabilising a rock mass including injecting into a hole at pressure an injectable media, the method including: Forming a Part AB by mixing at a Part A including water and a hydration inhibitor and a Part B including gypsum such that Part AB remains at a first viscosity below a pumpable viscosity threshold for a first time period, Mixing, immediately prior to introduction into the rock mass, the Part AB with a Part C including an activator and water to provide the injectable media having a second viscosity which is initially less than the first viscosity; and Pumping the injectable media into the hole at pressure such that the injectable media moves into and sets within at least one of voids, spaces and cracks of the rock mass, the second viscosity increasing over a setting time period toward a set viscosity at which the injectable media is no longer able to be pumped.

In an aspect, Part A and Part B are mixed in using an active mixer prior to forming a Part AB.

In another aspect, Part AB and Part C are mixed using a static mixer whilst being pumped into the hole at the pressure.

In accordance with a fourth broad aspect there is provided, a system to stabilise a rock mass using injectable media, the system including: a Part A including water and a hydration inhibitor, a Part B including gypsum, and a Part C including an activator and water that are combinable to form the injectable media; an active mixer adapted to mix Part A and Part B at or just prior to use to form a Part AB that remains at a first viscosity below a pumpable viscosity threshold for a first time period; a rod adapted to be insertable into a hole within the rock mass; a packer adapted to seal the rod to the hole to inhibit egress of the injectable media; and a pump in fluid communication with the rod via a static mixer adapted to mix Part AB and Part C; wherein the pump is adapted to provide a pressure suitable to mix Part AB and Part C via the static mixer and urge injectable media through the rod into at least one of voids, spaces and cracks of the rock mass such that the injectable media is settable therein to stabilise the rock mass, the mixing of Part AB with Part C resulting in the injectable media having a second viscosity initially less than the first viscosity, the second increasing over a setting time period so as to become set within the at least one of voids, spaces and cracks of the rock mass.

BRIEF DESCRIPTION OF THE FIGURES

The invention is described, by way of non-limiting example only, by reference to the accompanying figures, in which:

FIGS. 2 to 7 illustrate a sequence of steps to stabilise a rock mass using a system to mix and inject the composition into the rock mass.

DETAILED DESCRIPTION

Figure 1:
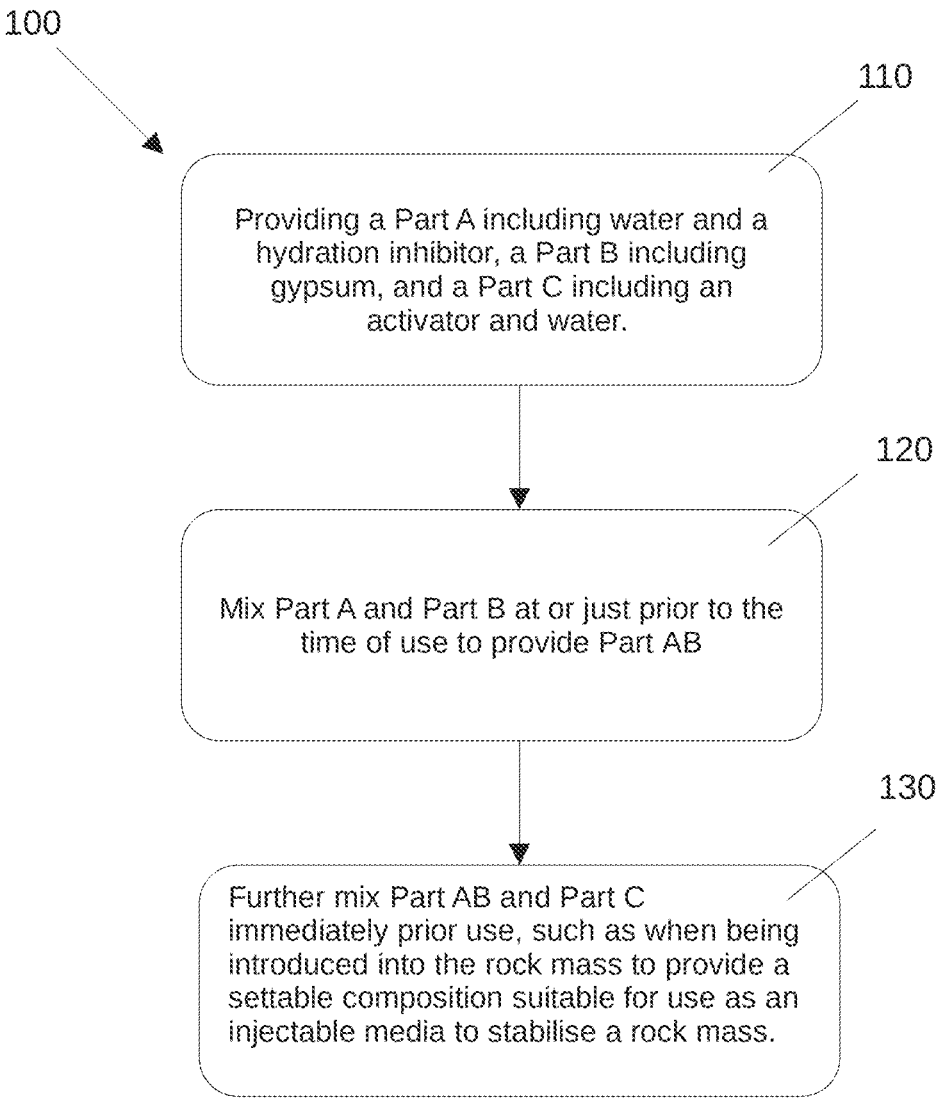
FIG. 1 is a flow chart illustrating a method of forming a composition for stabilising a rock mass.
Figures 5, 6, 7:
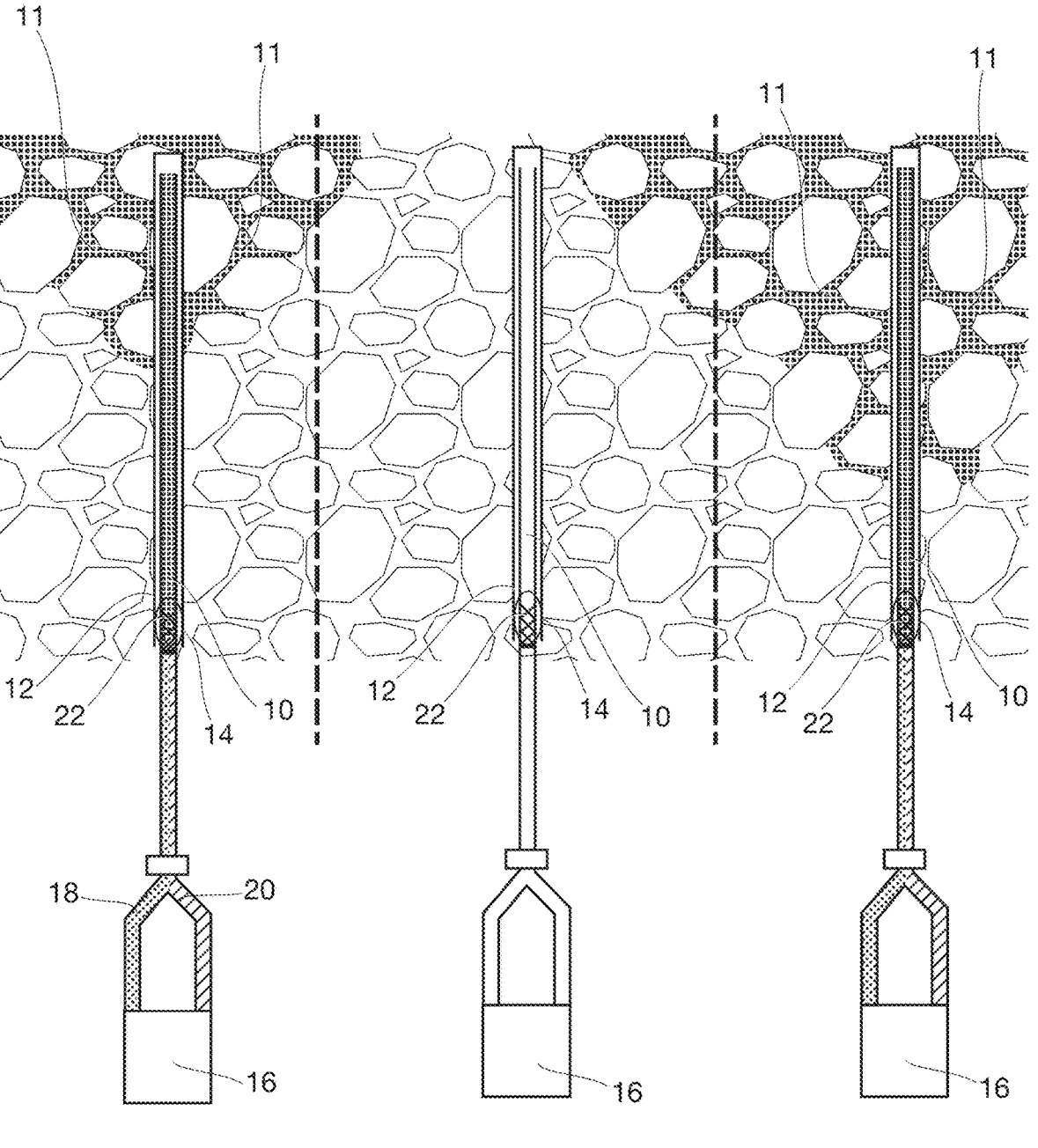

The invention relates to a composition for use in a method and a system to stabilise a rock mass in which initially retarded gypsum is accelerated at the time of introduction or injection into the rock mass. The retarding of the gypsum enables the use of gypsum in the application of the composition as an injectable media. The retarding of the gypsum may be accomplished by a retarder or hydration inhibitor that may be, but not limited to, a dispersant added to the gypsum to form a retarded gypsum mixture. This allow the initial gypsum based mixture to remain stable and able to be pumped prior to mixing with an accelerant.

The acceleration at the time of introduction or injection into the rock mass may be accomplished by using an accelerant such as, but not limited to, a salt such as aluminium sulphate dissolved in water that is added to the retarded gypsum mixture to form the composition. Upon introduction of the accelerant and water, the viscosity of the composition is initially less than that of the retarded gypsum so as to make it more easily pumpable, and able to enter cracks of the geological strata or the rock mass the before becoming set within the geological strata or the rock mass.

It has been identified that gypsum by itself has limited suitability for use as an injection media. However, the composition disclosed herein addresses issues with its suitability by initially retarding the gypsum to extend its setting time. Further, additional components such as acrylic polymers in the composition as are further detailed below provide the composition with an improved bond strength and improved resistance to water degradation.

In more detail, the present invention relates to a three-part composition for use as an injectable media to stabilise a rock mass such as, but not limited, to a roof of a mine road way or the like. The composition may include a Part A including water and a hydration inhibitor, a Part B including gypsum that may be in powdered form, and a Part C that includes an activator and water. Accordingly, Part A and C are initially liquid mixtures and Part B may be a solid powder.

The Part A, Part B and Part C may be combined during use to provide a setting injectable media or composition including generally four components (once combined) being the gypsum, the water, the hydration inhibitor and the activator. An example of % by weight of these components may be, Gypsum 40% to 80%, Water—20% to 60%, hydration inhibitor 0.01% to 5% and activator 0.01% to 5%.

Another example of water associated with Part A and Part C is about between 5% to 40%, and preferably about 10% to 30%, by weight of the mixed composition. The gypsum of Part B is about between 30% to 75%, and preferably 50% to 70%, by weight of the mixed composition.

The gypsum may be a powdered gypsum in a semi-hydrate state, the hydration inhibitor may be hydrophilic copolymer pigment dispersant such as OROTAN 1288 and the activator may be a salt such as aluminium Sulphate dissolved in water. It is noted that other suitable hydration inhibitors and activators may also be used, and the present composition, system and method are not limited to the specific example constituents disclosed herein.

The composition and mixing method as further detailed below function to inhibit or retard the hydration of gypsum upon mixing, and then activate the gypsum with an initially lowered viscosity for setting immediately prior to entering the rock mass.

General Viscosity Properties as a Function of Time

Figure 8:
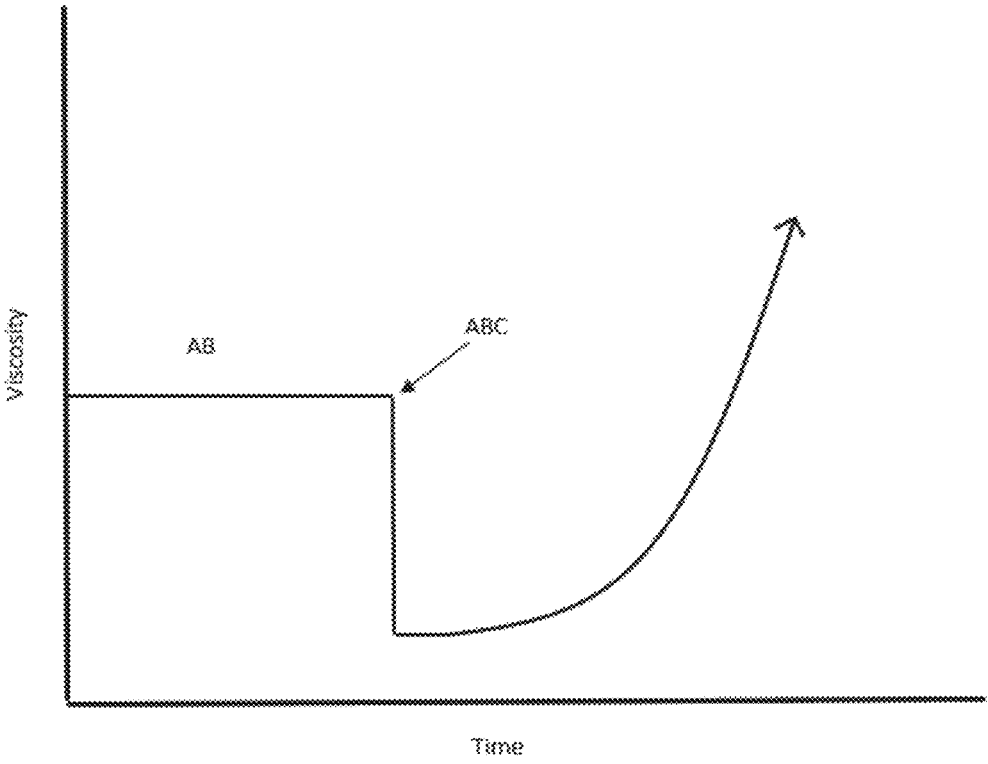
FIG. 8 is a graph showing composition viscosity as a function of time.

Referring to FIG. 8, Part A and Part B may be initially combined to provide a gypsum mixture that is retarded to remain in a pumpable state. Depending on the type and capacity of the pump, the pumpable state may be where the viscosity is less than about 20,000 cps (where "cps" stands for a Centipoise). The hydration inhibitor may be used to control the viscosity and maintain mixture AB in the pumpable state.

In this example, the pumpable state may include the AB mixture having a relatively stable first viscosity over a first time period. The first viscosity may be less a pump threshold viscosity, which may be about 20,000 cps, and preferably less an about 10,000 cps. The first time period may be at least about 10 minutes, but preferably at least about 30 minutes. For example, AB may be adapted to remain stable with a viscosity of about 8,000 cps for a period of at least about 30 minutes prior to being combined with Part C as shown in FIG. 8.

When Part AB is mixed with Part C, to form the composition (i.e., ABC as shown in FIG. 8) the viscosity changes and preferably undergoes an initially significant drop, dropping by more than about 1,000 cps and in some examples dropping in the range of about 5,000 to 10,000 cps. The viscosity of the finally mixed composition, then increases as a function of time to become set or considered set, in which the setting or set composition may have a viscosity over about 25,000 cps and preferably over at least about 50,000 cps.

In more detail, the viscosity drop allows the composition to more readily progress into cracks and crevasses of the rock material before the viscosity increases. This may be referred to as the composition being in an injectable state. For example, when Part AB is mixed with Part C, the viscosity of the composition may drop to a second or initial mixture viscosity that may be in the range about 500 cps to 5,000 cps and may be about 1,000 cps. This second or initial mixture viscosity in which the composition is in an injectable state is controllable by the amount of water in Part C. This also provides a lower viscosity starting point which may allow more activator to be used to provide a faster setting rate—with the lower starting point still allowing the composition to be in an injectable state for a suitable time period.

The setting time of the composition is controlled by increasing/decreasing the activator and also increasing/decreasing inhibitor. For example, increasing the activator will steepen then setting viscosity curve (i.e., the setting rate) shown in FIG. 8 whereas increasing the inhibitor will flatten the curve shown in FIG. 8. Preferably, the composition remains in a pumpable state, with its viscosity less than about 20,000 cps for at least about 1 minute and in some examples up to about 10 minutes, and approaches or is in a set state within about 2 hours. In some preferred examples, the pumpable state is maintained for about 4 minutes. The set state may be defined as the composition having a viscosity of at least about 25,000 to 50,000 cps, or greater.

Preferably, the composition (i.e. the mixture of Part AB and Part C) remains in the injectable state, having a relatively lower viscosity, that is lower than AB, in the range of about 500 to 5,000 cps for at least about 1 to 4 minutes to allow the composition to be easily pumped and enter cracks and crevasses of the rock mass. A preferred formulation of the composition exceeds 20,000 cps at about 4 minutes.

The composition then sets within the cracks and crevasses of the rock mass which may occur any time after it has become deposited and preferably in less than about 2 hours. Again, the set state may have a viscosity of at least about 25,000 to 50,000 cps, and the viscosity of the setting composition may increase as a function of time as it solidifies.

First Preferred Composition Example

In more detail, as best shown in Table 1 below, Part A may contain polymers, in particular acrylic emulsion polymers, hydration inhibitors, surfactants, dispersants, solvents and defoamer. Examples of the components of Part A include a polymer such as PRIMAL AC-339 which is a hydrophobic acrylic polymer, a defoamer such as Nopco NXZ, a surfactant such as Triton X-405, 70%, a dispersant such as OROTAN 1288, a further polymer such as Primal ECO-16 which is a binding or cross-linking polymer, a coelesctent such as Butyl Carbitol, 100%, water and an alkaline Agent such as $Ca(OH)^2$. Part B may simply be the gypsum powder and Part C includes the activator in the form of Aluminium Sulphate $[(AL^2(SO4)^3*14H20]$ dissolved in water.

TABLE 1

| | % By Weight | Parts by weight |
|---|---|---|
| First Composition Example | | |
| Part A Premix | 30% | |
| Polymer - PRIMAL AC-339 (Hydrophobic Acrylic Polymer) | 8.72% | 138.2 |
| Defoamer - Nopco NXZ | 0.19% | 3 |
| Surfactant - Triton X-405, 70% | 0.32% | 5.1 |
| Dispersant - OROTAN 1288 | 0.37% | 5.9 |
| Polymer - Primal ECO-16 (Acrylic Binding/cross-linking Polymer) | 4.99% | 79.1 |
| Coelesctent - Butyl Carbitol, 100% | 0.50% | 8 |
| Water | 14.75% | 233.8 |
| Alkaline Agent - Ca(OH)2 | 0.06% | 1 |
| Part B Solids | 64% | |
| Gypsum | 64.03% | 1014.9 |
| Part A and Part B Combined | 94% | 1489 |
| Part C | 6% | |
| Activator (AL2(SO4)3*14H20 | 0.29% | 4.6 |
| Water | 6% | 91.4 |

Prior to use, Part A and Part B are mixed, preferably to form Part AB using a mixer (not shown) such as, but not limited to, a ChemGrout™ CG-460 High Pressure Colloidal Series. The Part AB (now a pumpable mixture) may then be combined with Part C which activates and causes the setting of the composition, now including Part AB and C, as defined above. The system and method of the use of Part AB and Part C to provide the injectable media for rock stabilisation is now further described below with reference to FIGS. 1 to 7.

In more general terms, some of the functional aspects of the components of the composition are further detailed below. Firstly, the inclusion of acrylic polymers provides increased bond strength. Without acrylic polymers the gypsum may have low bond strength and be susceptible to water degradation. Acrylic polymers may not normally set within an acceptable timeframe in an underground rockmass due to the high humidity and lack of air flow as they set by "drying".

However, the gypsum is originally in a semi-hydrate state and requires water to crystallise. The gypsum after activation, quickly extracts water from the emulsified polymers to crystallise. This also causes the polymers to set and provide advantageous qualities such as bond strength, elastic deformation and water resistance. If the total amount of water in the mix is formulated to be stochiometric for gypsum crystallisation i.e. no excess water in the mix than is needed to fully crystalise the gypsum, then higher strengths, faster setting and better hardening of the gypsum and polymers occurs.

In relation to the binding or cross-linking polymers, it is noted that polymers do not essentially need to be self-cross-linking. However, the inclusion of a self-cross linking acrylic leads to improved mechanical properties (durability, bond strength, flexibility etc).

In relation to the water resistance or waterproofing. Gypsum by itself can be degraded by water. The inclusion of the hydrophobic acrylic polymers greatly enhances the materials water resistance. Water is typically present in underground rock masses. The acrylic polymers are APEO free providing advantages in chemical disposing and much lower risk to environment. APEO containing products are more toxic and bioaccumulate.

Finally, gypsum is notoriously fast setting compared to most cementitious materials. The use of the retarder, in this example the hydration inhibitor, allows longer workability of the mix prior to injection and the activator allows a rapid gain of strength to provide fast support to unstable ground. The addition of the above polymers enhances the materials properties to a point that the material becomes suitable as an injection media for rock mass stabilisation and may be used in the method and system as are further detailed below.

Second Preferred Example Composition

TABLE 2

| | Test No. | | | |
|---|---|---|---|---|
| | 1 | | 2 | |
| Second Composition Example with Activator Variations | Parts by weight (g) | Percentage | Parts by weight (g) | Percentage |
| Part A | | | | |
| Polymer - Primal ECO-16 | 105.4 | 5.27% | 105.4 | 5.27% |
| Water | 192.3 | 9.61% | 192.3 | 9.61% |
| Polymer - PRIMAL AC-339 | 184.1 | 9.20% | 184.1 | 9.20% |
| Defoamer - Nopco NXZ | 4 | 0.20% | 4 | 0.20% |
| Surfactant - Triton X-405, 70% | 6.8 | 0.34% | 6.8 | 0.34% |
| Dispersant - OROTAN 1288 | 7.86 | 0.39% | 7.86 | 0.39% |
| Coelesctent - Butyl Carbitol, 100% | 10.7 | 0.53% | 10.7 | 0.53% |
| Part B | | | | |
| Gypsum | 1352 | 67.60% | 1352 | 67.59% |

TABLE 2-continued

| Second Composition Example with Activator Variations | | | | | |
|---|---|---|---|---|---|
| Part C | Parts by weight (g)/ Activator % | | | Parts by weight (g)/ Activator % | | |
| Activator (AL2(SO4)3*14H20 | 3.36%* | 4.45** | 0.22%*** | 3.57%* | 4.73** | 0.24%*** |
| Water | | 132.5 | 6.62% | | 132.5 | 6.62% |

| | Test No. | | | |
|---|---|---|---|---|
| | 3 | | 4 | |
| | Parts by weight (g) | Percentage | Parts by weight (g) | Percentage |
| Part A | | | | |
| Polymer - Primal ECO-16 | 105.4 | 5.27% | 105.4 | 5.27% |
| Water | 192.3 | 9.62% | 192.3 | 9.62% |
| Polymer - PRIMAL AC-339 | 184.1 | 9.21% | 184.1 | 9.21% |
| Defoamer - Nopco NXZ | 4 | 0.20% | 4 | 0.20% |
| Surfactant - Triton X-405, 70% | 6.8 | 0.34% | 6.8 | 0.34% |
| Dispersant - OROTAN 1288 | 7.86 | 0.39% | 7.86 | 0.39% |
| Coelesctent - Butyl Carbitol, 100% | 10.7 | 0.54% | 10.7 | 0.54% |
| Part B | | | | |
| Gypsum | 1352 | 67.60% | 1352 | 67.61% |

| Part C | Parts by weight (g)/ Activator % | | | Parts by weight (g)/ Activator % | | |
|---|---|---|---|---|---|---|
| Activator (AL2(SO4)3*14H20 | 3.25%* | 4.3** | 0.22%*** | 3.00%* | 3.99** | 0.20%*** |
| Water | | 132.5 | 6.63% | | 132.5 | 6.63% |

Figure 9:
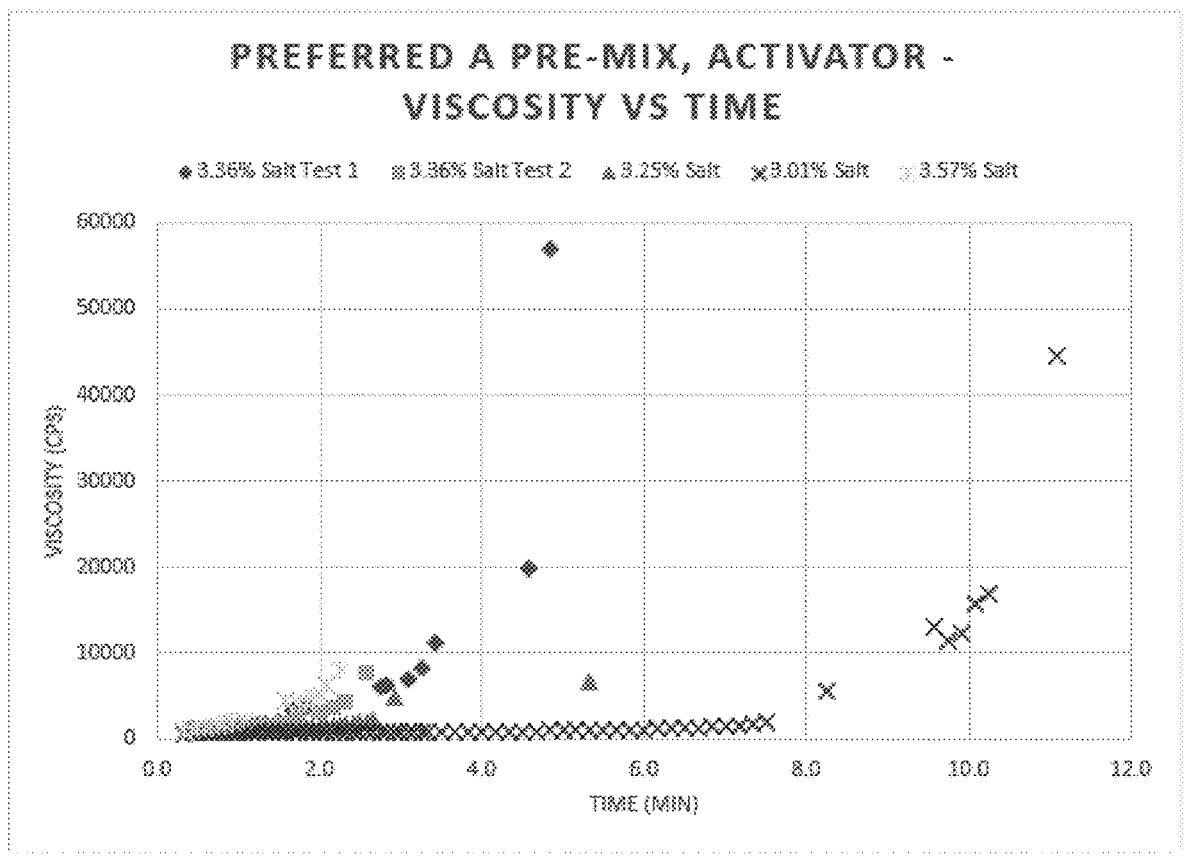
FIG. 9 is a graph showing viscosity as a function of time for composition (Part AB and Part C when mixed).

Table 2 shows a second a preferred example of the composition with the formulation of Parts A, B and C. The formulation is similar to the first example and the components are not again described here. However, in this example, the amount of the activator was varied to observe the effect on the viscosity of the composition as a function of time as shown in FIG. 9 which shows the results of the above test data shown in Table 2.

It is noted that for Part C as shown in Table 2, the percent of activator in relation to only Part C is indicated with a "*", the weight in grams within Part C is indicated with a "" and amount of activator as a % by weight of the overall composition is indicated by "*".

In this example, the preferred salt percentage is 3.36% of the Part C weight (which was tested twice as indicated by Test 1 and Test 2). It can be seen that with the salt percentage of about 3.36%, the viscosity remained relatively low, less than about 5,000 cps for about 2 minutes before starting to set with the viscosity increasing to above about 20,000 cps after about 5 mins which means the composition may no longer be pumpable. Higher salt amounts pushed the viscosity higher more quickly which may be suitable in some use cases and lower salt amounts kept the viscosity lower for more than 8 minutes.

In this example, for injecting through a drill rod and into a rock mass it was found that keeping the viscosity in the range of about 5,000 to 10,000 cps, or less, for a time of about 2 to 4 minutes was preferable as this allows enough time for pumping, whilst after about 2 to 4 minutes the composition starts to set to retain itself within the rock mass as it sets.

Experimental Data

Referring to Table 3 below, a summary of experimental results is provided indicating broadly if a particular combination was suitable or not suitable. The % data provided are a % by weight of the overall mixture (ABC).

The suitability criteria (suitable/not suitable) was generally set as follows—Part AB needs to stay below 20,000 cps for at least 30 minutes, preferably an even lower viscosity and preferably for much longer than 30 minutes, hours, weeks or even longer. This AB upper limit has been based on the application pump rating of 20,000 cps (Viscosity going through the pump pistons not downstream).

The combining of Part C to form the composition ABC will initially drop the viscosity to a value below the AB viscosity of (20,000 cps max); however the addition of C needs to cause the rapid viscosity increase between 1 minute and 60 minutes heading to unmeasurable as it solidifies. It needs to have measurable strength at within about 1 to 2 hours.

It is noted in these examples the dispersant, solvent, defoamer and activator etc are the same as those described above in relation to preferred examples 1 and 2. Tables 4 to 22 below provide examples of the composition viscosity as a function of time for each of the examples shown in Table 3.

TABLE 3

| | Summary of Experimental Results | | | | | | | | | |
|---|---|---|---|---|---|---|---|---|---|---|
| | Test | | | | | | | | | |
| | 1.1 | 1.2 | 1.3 | 1.4.1 | 1.4.2 | 2.1.1 | 2.1.2 | 2.2.1 | 2.2.2 | 2.3.1 |
| Suitable Ingredient Part A | Yes | Yes | Yes | Yes | Yes | No | Yes | No | Yes | No |
| Eco-16 | 5.28% | 5.29% | 5.30% | 5.30% | 5.30% | 5.19% | 5.21% | 5.19% | 5.12% | 4.91% |
| Water | 9.63% | 9.64% | 9.69% | 9.70% | 9.69% | 9.56% | 9.50% | 9.43% | 9.40% | 8.91% |
| AC-339 | 9.22% | 9.23% | 9.23% | 9.30% | 9.23% | 9.16% | 9.07% | 9.03% | 8.96% | 8.50% |
| Defoamer | 0.20% | 0.20% | 0.25% | 0.20% | 0.20% | 0.22% | 0.21% | 0.29% | 0.30% | 0.19% |
| Surfactant | 0.34% | 0.34% | 0.37% | 0.40% | 0.36% | 0.36% | 0.40% | 0.37% | 0.36% | 0.33% |
| Dispersant | 0.20% | 0.10% | 0.05% | 0.02% | 0.02% | 1.02% | 1.01% | 2.01% | 2.01% | 4.85% |
| Solvent Part B | 0.53% | 0.53% | 0.56% | 0.56% | 0.57% | 0.53% | 0.55% | 0.55% | 0.54% | 0.57% |
| Gypsum Part C | 67.74% | 67.81% | 67.72% | 67.88% | 67.78% | 67.11% | 66.76% | 66.30% | 65.77% | 65.10% |
| Activator | 0.22% | 0.22% | 0.22% | 0.01% | 0.22% | 0.22% | 0.70% | 0.22% | 0.99% | 0.22% |
| Water | 6.63% | 6.63% | 6.61% | 6.64% | 6.62% | 6.62% | 6.59% | 6.61% | 6.56% | 6.42% |

| | Test | | | | | | | |
|---|---|---|---|---|---|---|---|---|
| | 2.3.2 | 3.1 | 3.2 | 3.3 | 3.4 | 3.5 | 3.6 | 3.7 |
| Suitable Ingredient Part A | No | Yes | Yes | Yes | Yes | Yes | No | Yes |
| Eco-16 | 4.9% | 5.50% | 4.13% | 2.94% | 9.71% | 8.21% | 3.28% | 0.0% |
| Water | 9.1% | 5.89% | 27.7% | 40.81% | 17.73% | 14.73% | 9.57% | 20.1% |
| AC-339 | 8.7% | 9.69% | 7.20% | 5.18% | 17.48% | 14.06% | 5.66% | 0.0% |
| Defoamer | 0.2% | 0.27% | 0.19% | 0.11% | 0.36% | 0.34% | 0.16% | 0.0% |
| Surfactant | 0.3% | 0.36% | 0.27% | 0.21% | 0.62% | 0.62% | 0.24% | 0.0% |
| Dispersant | 5.0% | 0.42% | 0.30% | 0.23% | 0.71% | 0.67% | 0.20% | 0.4% |
| Solvent Part B | 0.5% | 0.60% | 0.44% | 0.30% | 0.97% | 0.81% | 0.26% | 0.0% |
| Gypsum Part C | 63.7% | 70.44% | 52.86% | 43.76% | 39.81% | 49.69% | 79.97% | 72.0% |
| Activator | 1.0% | 0.22% | 0.23% | 0.23% | 0.42% | 0.35% | 0.16% | 0.2% |
| Water | 6.6% | 6.60% | 6.61% | 6.22% | 12.19% | 10.50% | 0.50% | 7.2% |

An interesting result that has arisen was test 3.7 in which most components were removed leaving Part A with just water and the dispersant, Part B the Gypsum, and Part C the activator and water. This formulation was found to be suitable to meet the initially pumping state criteria, and then set in a suitable timeframe as is further shown below in the graphs.

It is noted these graphs measure the viscosity at the mixing of Parts AB, and Part C. It is further noted that Part AB was measured before each test and was generally found to be in the range of 6,000 to 12,000 cps. However, in some cases, such as using 0.01% of the dispersant—Part AB was found to be too viscous such as having a viscosity of about 20,000 cps after only 10 minutes and therefore these samples where not tested further.

TABLE 4

| Test Composition 1.1 | |
|---|---|
| Test 1.1 - 0.2% Dispersant | |
| Time seconds | Viscosity (cps) |
| 20 | 843 |
| 25 | 1157 |
| 30 | 1224 |

TABLE 4-continued

| Test Composition 1.1 | |
|---|---|
| Test 1.1 - 0.2% Dispersant | |
| Time seconds | Viscosity (cps) |
| 35 | 1328 |
| 40 | 1439 |
| 45 | 1563 |
| 50 | 1709 |
| 55 | 1878 |
| 60 | 2085 |
| 150 | 25,220 |
| 160 | 61,998 |
| 170 | >100,000 |

TABLE 5

| Test Composition 1.2 | |
|---|---|
| Test 1.2 - 0.1% Dispersant | |
| Time (Sec) | Viscosity (cps) |
| 20 | 948 |
| 25 | 958 |
| 30 | 999 |

TABLE 5-continued

| Test Composition 1.2 | |
| --- | --- |
| Test 1.2 - 0.1% Dispersant | |
| Time (Sec) | Viscosity (cps) |
| 35 | 1055 |
| 40 | 1124 |
| 45 | 1211 |
| 50 | 1316 |
| 55 | 1443 |
| 60 | 1602 |
| 65 | 1795 |
| 70 | 2026 |
| 130 | 8,466 |
| 140 | 14,154 |
| 145 | 30,976 |
| 150 | >100,000 |

TABLE 6

| Test Composition 1.3 | |
| --- | --- |
| Test 1.3 - 0.5% Dispersant | |
| Time (sec) | Viscosity (cps) |
| 20 | 736 |
| 30 | 808 |
| 40 | 900 |
| 50 | 1031 |
| 60 | 1200 |
| 70 | 1434 |
| 80 | 1779 |
| 90 | 2014 |
| 130 | Not flowing / Set |

TABLE 7

| Test Composition 1.4.1 | | |
| --- | --- | --- |
| Test 1.4.1 - 0.02% Dispersant (inhibitor) & Low Activator 0.01% | | |
| Time (sec) | Time (min) | Viscosity (cps) |
| 30 | 0.5 | 950 |
| 90 | 1.5 | 931 |
| 150 | 2.5 | 1016 |
| 260 | 4.3 | 1093 |
| 330 | 5.5 | 1004 |
| 390 | 6.5 | 917 |
| 570 | 9.5 | 1211 |
| 800 | 13.3 | 1250 |
| 825 | 13.8 | 1483 |
| 920 | 15.3 | 1374 |
| 1020 | 17.0 | 1735 |
| 1100 | 18.3 | 1248 |
| 1180 | 19.7 | 1528 |
| 1320 | 22.0 | 1535 |
| 1430 | 23.8 | 1644 |
| 1520 | 25.3 | 1955 |
| 1620 | 27.0 | 3695 |
| 1710 | 28.5 | 3981 |
| 1780 | 29.7 | 3100 |
| 1860 | 31.0 | 5170 |
| 1920 | 32.0 | 6523 |

TABLE 8

| Test Composition 1.4.2 | | |
| --- | --- | --- |
| Test 1.4.2 - 0.02% Dispersant (inhibitor) & normal Activator 0.02% | | |
| Time (sec) | Time (min) | Viscosity (cps) |
| 20 | 0.33 | 1720 |
| 35 | 0.58 | 1793 |
| 40 | 0.67 | 1878 |
| 45 | 0.75 | 1981 |
| 50 | 0.83 | 2101 |
| 90 | 1.5 | 8215 |
| 134 | 2.2 | 11912 |
| 150 | 2.5 | 14556 |
| 155 | 2.58 | 20057 |
| 165 | 2.75 | 29046 |

TABLE 9

| AB Viscosity only for Test Composition 1.4.2 | | |
| --- | --- | --- |
| AB only viscosity for Test case 1.4.2 | | |
| Time (sec) | Tim (Min) | Viscosity (cps) |
| 120 | 2 | 5929 |
| 240 | 4 | 5917 |
| 360 | 6 | 5964 |
| 1140 | 19 | 7240 |
| 1260 | 21 | 6567 |
| 1380 | 23 | 7304 |
| 1440 | 24 | 6974 |
| 1560 | 26 | 7288 |
| 2280 | 38 | 7939 |
| 1920 | 32 | 8304 |
| 2040 | 34 | 7975 |
| 2160 | 36 | 8466 |
| 2280 | 38 | 10112 |
| 2340 | 39 | 10942 |
| 2400 | 40 | 11960 |
| 2460 | 41 | 15087 |
| 2580 | 43 | 23335 |
| 2640 | 44 | 53479 |
| 2700 | 45 | 316129 |

| Test 1.5 - AB only for Dispersant 0.01% | | |
| --- | --- | --- |
| Time (sec) | Time (min) | Viscosity |
| 180 | 3 | 6,599 |
| 780 | 13 | 8,343 |
| 960 | 16 | 22,000 |
| 1020 | 17 | 36,139 |
| 1080 | 18 | 67,139 |
| 1200 | 20 | 151,334 |

In relation to test composition 1.4.2, it is noted that with the dispersant at 0.01% the pot life of AB is not usable to then mix ABC underground. It appears that 0.02% when using the dispersant (Orotan 1288) is the lower limit. However, another dispersant may be usable at 0.01%.

It is noted a test 1.6 was also performed with 0% dispersant (inhibitor) in AB, and it was found that AB alone set within 10 minutes which is not considered suitable. As such, it is believed the dispersant (inhibitor) in AB is required for most examples.

Table 10—AB Viscosity only for Test Composition 1.5

| Test 2.1.1 - 1% Dispersant and 0.2% Activator Time (sec) | Time (hrs) | Viscosity (cps) |
|---|---|---|
| 20 | 0 | 898 |
| 6540 | 1.8 | 1,263 |
| 16380 | 4.55 | 722 |
| 41400 | 11.5 | 898 |

It is noted a test 2.1.1 did not set within a suitable time limit (less than about 2 hours) and therefore requires a higher activator.

Table 11—Test Composition 2.1.1

TABLE 12

| Test Composition 2.1.2 | | |
|---|---|---|
| Test 2.1.2 - 1% Dispersant and 0.7% Activator Time (sec) | Time (min) | Viscosity (cps) |
| 10 | 0.17 | 898 |
| 60 | 1 | Butter consistency, set |

TABLE 13

| Test Composition 2.2.1 | | |
|---|---|---|
| Test 2.2.1 - 2% Dispersant and 0.2% Activator Time (sec) | Time (hrs) | Viscosity |
| 15600 | 4.33 | 1,302 |
| 76788 | 21.33 | 1,057 |

TABLE 14

| Test Composition 2.3.1 | | |
|---|---|---|
| Test 2.3. 1 - 5% Dispersant and 0.2% Activator Time (sec) | Time (hrs) | Viscosity (cps) |
| 0 | 0 | 32,995 |
| 4788 | 1.33 | 30,512 |
| 15012 | 4.17 | 26,607 |
| 81720 | 22.7 | 19,448 |

In relation to test 2.2.1, the composition was too viscous to be practical for the application and also did not set within a suitable time frame, and therefore appeared to require more activator.

TABLE 15

| Test Composition 2.3.2 | | |
|---|---|---|
| Test 2.3.2 - 5% Dispersant and 1% Activator Time (sec) | Time (min) | Viscosity (cps) |
| 160 | 2.67 | 50134 |
| 205 | 3.42 | 99315 |
| 230 | 3.83 | 111256 |

In relation to test 2.3.2, the composition set in reasonable time but started too viscous and was therefore may not be able to be pumped.

TABLE 16

| Dispersant/Activator Summary Table | | | |
|---|---|---|---|
| Dispersant | Activator Summary | | |
| Dispersant | Salt/Activator | Suitable | Reason |
| 0.00% | 0% | No | Set-time on AB too short |
| 0.01% | 0% | No | Set-time on AB too short <40 min |
| 0.02% | 0.01% | Yes | Suitable Set-time, Low initial viscosity |
| 0.02% | 0.22% | Yes | Suitable Set-time, Low initial viscosity |
| 0.05% | 0.22% | Yes | Suitable Set-time, Low initial viscosity |
| 0.1% | 0.22% | Yes | Suitable Set-time, Low initial viscosity |
| 0.2% | 0.22% | Yes | Suitable Set-time, Low initial viscosity |
| 1% | 0.22% | No | Did not set in suitable time, criteria <2 hrs |
| 1% | 0.7% | Yes | Suitable Set-time, Low initial viscosity |
| 2% | 0.22% | No | Did not set in suitable time, criteria |
| 2% | 1% | Yes | Suitable Set-time, Low initial viscosity |
| 5% | 0.22% | No | Starting Viscosity too high |
| 5% | 1% | No | Starting Viscosity too high |

TABLE 17

| Test Composition 3.1 Water/Gypsum variation | |
|---|---|
| Test 3.1 - 20% total associated water, 70% Gypsum Time (sec) | Viscosity (cps) |
| 35 | 2018 |
| 40 | 1916 |
| 50 | 1898 |
| 60 | 1930 |
| 65 | 2017 |
| 70 | 2063 |
| 75 | 2114 |
| 85 | 2167 |
| 90 | 2298 |
| 100 | 2369 |
| 105 | 2459 |
| 110 | 2672 |
| 115 | 2810 |
| 120 | 2966 |
| 125 | 3149 |
| 130 | 3353 |
| 135 | 3600 |
| 140 | 3864 |
| 145 | 4179 |
| 150 | 4558 |

TABLE 17-continued

| Test Composition 3.1 Water/Gypsum variation | |
| --- | --- |
| Test 3.1 - 20% total associated water, 70% Gypsum | |
| Time (sec) | Viscosity (cps) |
| 155 | 4978 |
| 160 | 5491 |
| 170 | 6123 |
| 175 | 7009 |
| 180 | 8356 |
| 185 | 10000 |
| 315 | 45079 |
| 370 | 67796 |

TABLE 18

| Test Composition 3.2 Water/Gypsum variation | |
| --- | --- |
| 3.2. 40% total associated water, 53% Gypsum | |
| Time (sec) | Viscosity (cps) |
| 35 | 66 |
| 40 | 65 |
| 50 | 65 |
| 60 | 65 |
| 70 | 66 |
| 80 | 68 |
| 90 | 76 |
| 100 | 84 |
| 110 | 94 |
| 120 | 106 |
| 130 | 118 |
| 140 | 134 |
| 150 | 147 |
| 160 | 172 |
| 170 | 194 |
| 180 | 223 |
| 190 | 250 |
| 200 | 300 |
| 210 | 333 |
| 220 | 414 |
| 230 | 474 |
| 240 | 561 |
| 250 | 664 |
| 260 | 800 |
| 285 | 1600 |
| 300 | 4042 |
| 405 | 10183 |
| 520 | 84103 |
| 540 | 133873 |

TABLE 19

| Test Composition 3.3 Water/Gypsum variation | |
| --- | --- |
| 3.3 - 54% total associated water, 40% Gypsum | |
| Time (sec) | Viscosity (cps) |
| 55 | 55 |
| 60 | 40 |
| 100 | 39 |
| 120 | 39 |
| 130 | 40 |
| 150 | 50 |
| 160 | 58 |
| 170 | 70 |
| 180 | 80 |
| 190 | 90 |
| 200 | 104 |

TABLE 19-continued

| Test Composition 3.3 Water/Gypsum variation | |
| --- | --- |
| 3.3 - 54% total associated water, 40% Gypsum | |
| Time (sec) | Viscosity (cps) |
| 210 | 117 |
| 220 | 129 |
| 230 | 141 |
| 240 | 156 |
| 250 | 177 |
| 260 | 205 |
| 270 | 247 |
| 280 | 299 |
| 390 | 347 |
| 420 | 424 |
| 430 | 122 |
| 450 | 161 |
| 470 | 181 |
| 480 | 227 |
| 500 | 272 |
| 550 | 304 |
| 560 | 393 |
| 570 | 1289 |
| 580 | 1294 |
| 800 | 4301 |
| 810 | 6662 |
| 820 | 8246 |
| 835 | 8999 |
| 840 | 9922 |
| 850 | 9183 |
| 940 | 68884 |

TABLE 20

| Test Composition 3.4 Water/Gypsum variation | |
| --- | --- |
| 3.4 - 40% Gypsum | |
| Time (sec) | Viscosity (cps) |
| 10 | 46 |
| 30 | 45 |
| 40 | 45 |
| 50 | 45 |
| 60 | 46 |
| 80 | 48 |
| 100 | 52 |
| 120 | 55 |
| 140 | 57 |
| 170 | 63 |
| 180 | 67 |
| 190 | 73 |
| 200 | 77 |
| 210 | 80 |
| 230 | 91 |
| 240 | 96 |
| 260 | 110 |
| 270 | 120 |
| 350 | 72 |
| 380 | 93 |
| 390 | 101 |
| 400 | 108 |
| 410 | 116 |
| 420 | 125 |
| 430 | 137 |
| 440 | 148 |
| 450 | 156 |
| 460 | 170 |
| 470 | 183 |
| 480 | 197 |
| 490 | 210 |
| 500 | 226 |
| 510 | 250 |
| 530 | 280 |
| 540 | 301 |
| 550 | 329 |

Line numbers (column markers): 5, 10, 15, 20, 25, 30, 35, 40, 45, 50, 55, 60, 65

TABLE 20-continued

| Test Composition 3.4 Water/Gypsum variation | |
| --- | --- |
| 3.4 - 40% Gypsum | |
| Time (sec) | Viscosity (cps) |
| 570 | 553 |
| 580 | 620 |
| 590 | 691 |
| 600 | 767 |
| 620 | 1773 |
| 640 | 3244 |
| 700 | 17011 |
| 720 | 7203 |
| 735 | 15182 |
| 755 | 25756 |
| 830 | 48084 |
| 850 | 57074 |
| 875 | 124716 |

TABLE 21

| Test Composition 3.4 Water/Gypsum variation | |
| --- | --- |
| Test 3.5 50% Gypsum | |
| Time (sec) | Viscosity (cps) |
| 60 | 75 |
| 70 | 78 |
| 80 | 74 |
| 100 | 70 |
| 120 | 69 |
| 150 | 68 |
| 180 | 70 |
| 210 | 73 |
| 270 | 80 |
| 300 | 85 |
| 330 | 89 |
| 360 | 92 |
| 390 | 96 |
| 420 | 101 |
| 450 | 104 |
| 510 | 119 |
| 540 | 122 |
| 600 | 132 |
| 660 | 142 |
| 780 | 166 |
| 840 | 176 |
| 900 | 189 |
| 960 | 205 |
| 1800 | 264 |
| 2640 | 730 |
| 3180 | 9392 |
| 3240 | 10442 |

It is noted that for test composition 3.6, that mixture AB was too viscous and dry to pump with the viscosity of about being about 47,379 cps, and the mixed ABC viscosity being approximately 40,000 cps.

TABLE 22

| Test Composition 3.7 | |
| --- | --- |
| Test 3.7 - Water, Dispersant, Gypsum & Activator only mix | |
| Time (sec) | Viscosity (cps) |
| 20 | 3017 |
| 40 | 3611 |
| 90 | 6984 |
| 110 | 7988 |
| Changed instrument settings | Considered Set |

As aforesaid, test composition 3.7 was found to be suitable, in terms of pumping viscosity and set times, having only water, the dispersant, gypsum and activator. However, as noted in relation to the preferred composition examples there are other components such as the polymers that assist with bond strength when the material is set, and these additional components further improve the performance of the composition beyond the base form of the composition as shown in example 3.7.

Example Method of Use

Referring to FIG. 1, a method 100 to form the composition for stabilising a rock mass may include, at step 110, providing, at site, Part A including water and a hydration inhibitor, a Part B including gypsum, and a Part C including an activator and water. At step 120, Part A and Part B are mixed at or just prior to the time of use to provide Part AB. As discussed above, the mixture of AB is formulated so as to be in the pumpable state and have a fairly stable and pumpable viscosity for the first time period that may be, but not limited to, at least above 30 minutes.

At step 130, Part AB and Part C immediately prior to introduction into the rock mass in which Part C activates Part AB to set the composition once it has been injected into the rock mass as is further detailed below. It is noted that in some examples, the Part AB may be pre-made on or off-site, and the Part AB may be combined with Part C just prior to use. As such, in this example, the composition may be considered to be formed using two-parts as opposed to the three-parts as has been detailed below.

Turning to now FIGS. 2 to 7, the composition, indicated in the drawing by reference numeral 11, may be used in a system 5 in a method for stabilising a rock mass 9. The system 5 includes a hollow rod 10 for inserting into a hole 12 of the rock mass 9, a packer 14 that in use forms an inflatable seal between the rod 10 and the hole 12 to inhibit egress of injected media, a pump 16, a Part AB composition and a Part C composition (located in containers or the like, not shown, in communication with the pump 16), and associated Part AB and Part C conduits 18, 20 to communicate the Part AB and Part C between the pump 16 to be mixed to form the injectable media 11 within the rod 10. A mixer 22 may be provided that in this example may be a static mixer formed within the packer 14 to assist to mix the Part AB and the Part C to form the composition.

The rod 10 may be hollow steel rod with a length in the range of, but not limited to, 1 to 5 metres and may be include a plurality of connectable rods that form a string of rods. The diameter of the rods may be in the range of about 5 to 50 mm. The pump 16 may be any suitable pump capable to pumping a two-part viscous material quantity in the range of 1 litres to 1000 litres per hole and more usually 50 to 500 litres per hole to a predetermined pressure that may be a predetermined value or the maximum pressure of the pump. In some cases, it is noted the hole may take relatively small volume of the composition if there are no or few cracks.

The pressure at the pump may be in the range of about 100 BAR to 500 BAR, and may be 200 BAR to 400 BAR, and may in some examples be about 300 BAR depending on the selection of the pump 16, as further detailed below. It is noted that in the example application disclosed herein, pumping may be stopped at about t 110 BAR pressure at the Hole Collar, otherwise damage to strata can occur i.e. fracking/jacking. This pressure may be higher for hardrock mines with stronger surrounding coal. The pressure at the collar also increases from 0 BAR at the commencement of injection to a self-imposed stop point at 110 BAR when the strata material is, for example, coal.

The pump 16 may be a high-pressure pump capable of providing a pressure of about 300 BAR which allows it to pump up to about a victory of 20,000 cps which sets a pump viscosity threshold. A suitable pump is model XP-hf available from Graco™. Of course, other suitable pumps may be utilised. The packer 14 may be an inflatable packer that inflates in response to the follow of media 11 into the rod 14. An example of the suitable packer that includes a static mixer is model HT-40 or X-Grid available from Stamixco™. Of course, other suitable seals may be utilised.

Turning now to a more detailed method for stabilising a rock mass 9 using the system 5 and the injectable media 11, the method may include drilling one or more holes 12 into the rock mass 9. The rod 10 and pressure packer 14 including the mixer 22 are inserted into the drill hole 22 proximate the opening 15 of the hole 12. However, it is noted that the packer 14 may be positioned at any depth within the hole 12.

The Part A and Part B are mixed, preferably onsite, at or just prior to being used to form Part AB. The Part AB may be temporarily stored in a container such as for at least about 30 minutes perhaps as long as a several hours or days.

The Part AB and Part C component product conduits 18, 20 are connected to the rod 10 and mixed in the packer 14 to form the media 11. The pump 16 is activated to pump Part AB and Part C into the packer 14 to inflate the packer 14, seal the hole 12 and also anchor the rod 10. The packer 14 may include a plug (not shown) that is adapted to release at a release pressure to allow the media to flow into rod 10 and therefrom into the rock mass. The media 11 may flow from an inserted end 17 of the rod 19 proximate an end 19 of the hole 12 and into any crack, void or the like of the surrounding rock mass 9.

When a predetermined pressure is reached such as, but not limited to, 300 BAR, at the pump 16, this indicates all cracks, void or the like have been filled within the hole 12 to a certain penetration distance within the rock mass 9. It is noted that in this example, pressure is measured at the hole collar to indicate when pumping should be stopped to limit damage to surrounding strata. In this example, pumping may be stopped at around 110 BAR at the collar. The pressure at the pump will be higher than this but dependant on the length of hoses from the mixing/pumping site to the hole site.

The distance consolidated is determined by products viscosity, available pump pressure and rock mass crack network. When the hole 12 is filled the conduits 18, 20 are disconnected and then connected to the rod in the next hole etc. It is noted that there is a lesser pressure at the 'Y' piece. The set relief pressure of the pump may be based on the rock type and inherent properties of the rock. If the set pressure is exceeded the rockmass could be further fractured rather than glued, which may be undesirable. It is further noted that The set relief on the pump can be set to the rating of the hoses for safety; or calibrated to account for the pressure in the hoses to relief when the hole collar pressure is at around 110 BAR or lower or higher. i.e. the pressure at the pump may be reading 300 BAR and the pressure at the collar may be reading 110 BAR then relief at the pump can be set at 300 BAR, being calibrated to the collar pressure, providing no further changes to the hose length or orifice size.

Advantages

Advantageously, there has been described a composition including a Part A, Part B and Part C. Part A including water and the hydration inhibitor and Part B including gypsum that may be in powdered form are adapted to be mixed to provide Part AB, which is a polymer modified gypsum composition, just prior to use onsite which alleviates issues relating to settlement of the product in containers. The ratio of the mixture of Part AB allows the quantity of the components such as gypsum to be controlled and allow adjustment, for example, of the strength of the final set media. Part C that includes an activator and water, may be combined then with Part AB to provide the settable media that is injected into the rock mass for stabilisation.

Part AB is formulated to remain stable at a pumpable viscosity for a time period that may be about 30 minutes or longer. When Part C is introduced with the activator, water is also added which temporarily lowers the viscosity which allow the mixed composition comprising Parts A, B, C to be more easily pumped into cracks and crevasses of the rock. Moreover, by lowering the starting viscosity of the composition, more time is provided before the composition becomes unable to be pumped and/or sets. This may allow more activator to be used to lower the overall set time as the lower initial viscosity provides a time window in which the composition is pumpable and injectable into the media— which may the quite rapidly set so as to be retained in the rock.

Further advantageously, there has been described a method, a system and media for stabilising a rock mass in which media is injected to the rock mass. In particular, a media including polymer modified gypsum composition has been identified and found suitable for injecting under pressure into a rock mass via a rod to stabilise the rock mass. The use of the media has been found to provide the advantages of having microfine particle size to be able to flow into very small crack, limited or no dust and minimal quantities of toxic vapours.

Further still advantageously, the present media may have only a limited exothermic reaction, being an admixture, and as such may not need to be limited in quantity like many products that have a significant exothermic reaction. In industry, this value may be around 350 Litres per hole. The present media may not have this constraint due to its low exothermic properties so product quantity per hole may be increased and may only be limited by available pump pressure or maximum allowable pressure within the rockmass for the rock type. This allows the rock mass to be stabilised or "glued" to a greater extent. The present media may also have a controlled set time and can be adjusted to ensure the product does not set whilst cracks in a consolidation are still being filled.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

What is claimed is:

1. A method of stabilising a rock mass including injecting into a hole at pressure an injectable media, the method including:
   a. Forming a Part AB by mixing at a Part A including water and a hydration inhibitor and a Part B including gypsum such that Part AB remains at a first viscosity below a pumpable viscosity threshold for a first time period;
   b. Mixing, immediately prior to introduction into the rock mass, the Part AB with a Part C including an activator and water to provide the injectable media having a second viscosity which is initially at least about 2,500 cps less than the first viscosity; and
   c. Pumping the injectable media into the hole at pressure such that the injectable media moves into and sets within at least one of voids, spaces and cracks of the rock mass, the second viscosity increasing over an injection time period toward a pumpability threshold at which the injectable media is no longer able to be pumped, the injection time period being less than about 5 minutes.

2. The method according to claim 1, wherein the injection time period is in the range of about 2 to 5 minutes.

3. The method according to claim 1, wherein the second viscosity 5,000 cps less than the first viscosity.

4. The method according to claim 1, wherein the first time period is at least about 30 minutes.

5. The method according to claim 1, wherein the pumpable viscosity threshold is about 20,000 cps.

6. The method according to claim 1, wherein the first viscosity is preferably less than about 10,000 cps.

7. The method according to claim 1, wherein the second viscosity is initially less than about 5,000 cps.

8. The method according to claim 1, wherein the second viscosity is initially less than about 2,500 cps.

9. The method according to claim 1, wherein the second viscosity is initially less than about 1,000 cps.

10. The method according to claim 1, wherein the setting time period is less than about 2 hours.

11. The method according to claim 1, wherein the setting time period is less than about 1 hour.

12. The method according to claim 1, wherein the setting time period is preferably in the range of about 4 minutes to 2 hours.

13. The method according to claim 1, wherein the second viscosity increases toward a set viscosity within the hole, the set viscosity being greater than the pumpable viscosity threshold.

14. The method according to claim 13, wherein the set viscosity is greater than 25,000 cps.

15. The method according to claim 14, wherein the set viscosity is greater than 50,000 cps.

16. The method according to claim 1, wherein the hydration inhibitor of Part A is a dispersant.

17. The method according to claim 1, wherein Part B is a dry gypsum powder.

18. The method according to claim 1, wherein the gypsum of Part B is about between 30% to 75%, and preferably 50% to 70%, by weight of the mixed composition.

19. The method according to claim 1, wherein Part AB is a premixed composition.

20. An injectable composition used in a method in accordance with claim 1.

* * * * *